United States Patent [19]

Oldfield et al.

[11] 3,970,191

[45] July 20, 1976

[54] TRANSFER APPARATUS

[75] Inventors: Derek Oldfield, Killamarsh, near Sheffield; Dennis Postlethwaite, Rotherham, both of England

[73] Assignee: Wean United, Inc., Pittsburgh, Pa.

[22] Filed: Feb. 3, 1975

[21] Appl. No.: 546,662

[30] Foreign Application Priority Data
Feb. 11, 1974 United Kingdom.................. 6177/74

[52] U.S. Cl................................ 198/219; 214/85.5
[51] Int. Cl.².......................................... B65G 25/04
[58] Field of Search ............ 254/147; 198/218, 219; 104/162, 173; 214/85.3, 85.1, 83.36

[56] References Cited
UNITED STATES PATENTS

| | | | |
|---|---|---|---|
| 2,073,097 | 3/1937 | Dziedzic et al. | 198/219 |
| 3,451,532 | 6/1969 | Manterfield | 198/219 |
| 3,566,801 | 3/1971 | Ashurst | 198/218 |
| 3,581,880 | 6/1971 | Iversen | 198/219 |
| 3,658,171 | 4/1972 | Fakada | 198/219 |
| 3,754,528 | 8/1973 | Downing | 198/218 |

*Primary Examiner*—Frank E. Werner
*Assistant Examiner*—Kenneth Noland
*Attorney, Agent, or Firm*—Daniel Patch; Henry C. Westin

[57] ABSTRACT

Transfer apparatus for a workpiece such as a metal slab, bloom or coil of metal strip comprises a carriage supported on a substantially horizontal beam. The beam is displaceable in the direction of its length and the ends of a flexible cable are connected to opposite ends of the carriage with a reach of the cable extending substantially parallel to the length of the beam. An intermediate point of the cable is firmly anchored so that displacement of the beam causes the carriage to be displaced along the beam as well as its movement with the beam. The beam can also be raised and lowered.

6 Claims, 2 Drawing Figures

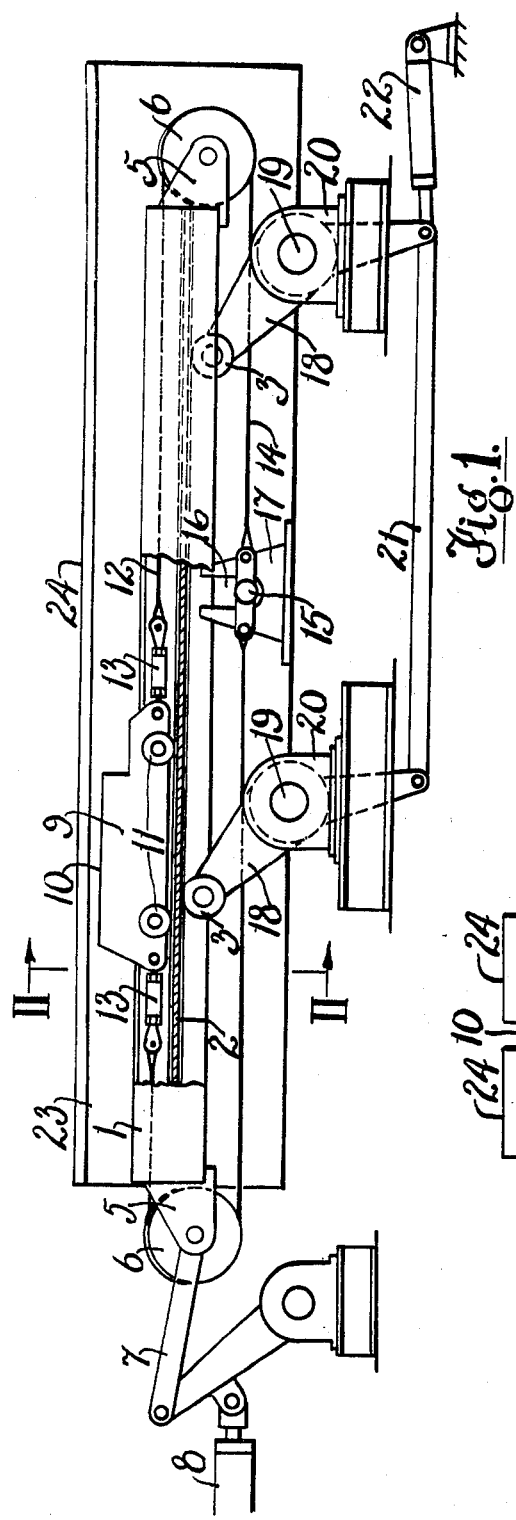
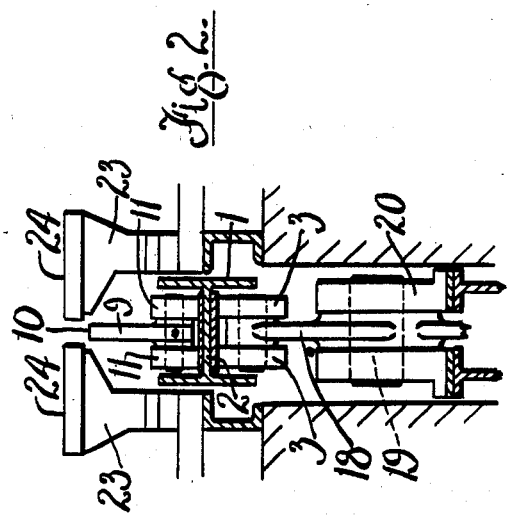

TRANSFER APPARATUS

This invention relates to apparatus for transferring a workpiece horizontally between two positions. In many industrial applications it is necessary to displace a workpiece between two positions and one application of this invention is to apparatus for transferring a workpiece such as a metal slab, bloom or section or a coil of metal strip from one position to another.

According to the present invention transfer apparatus comprises an elongate beam arranged substantially horizontal and displaceable in the direction of its length, a carriage providing a support for a workpiece, said carriage being supported on the beam so as to be displaceable there along and an elongate flexible member connected at its ends to opposite ends of the carriage with a reach of the flexible member extending substantially parallel to the length of the beam, said flexible member being anchored at a position intermediate its ends to a part other than the beam whereby displacement of the beam causes the carriage to be displaced along the beam in addition to its movement with the beam.

Preferably the flexible member passes around a pair of pulleys positioned one at each end of the beam with said reach extending along the length of the beam. It is preferred for the flexible member to be anchored at a position substantially half way along its length.

The effect of providing the flexible member connected at its opposite ends to the carriage and anchored at a point intermediate its length is to increase the movement of the carriage over the movement of the beam in the direction of its length. On displacement of the beam in the direction of its length the carriage is displaced with the beam in the direction of movement thereof but in addition the carriage is displaced along the beam relative to the beam by the action of the anchored flexible member. In this way to bring about a particular distance of travel of the carriage, the beam has to be displaced by a smaller distance than would be the case if the flexible member was not provided. This is important in that it permits the means for displacing the beam, which usually takes the form of a piston cylinder device or a rotatable crank, to be of a smaller stroke than would otherwise be required to bring about the required distance of travel.

The workpiece may be placed on the carriage in one position and removed from the carriage in another position but alternatively means may be provided for raising and lowering the beam independently of its displacement in its longitudinal direction whereby the carriage can be lifted upwards into engagement with the underside of a workpiece to take the weight of the workpiece, the beam and the carriage may be displaced substantially horizontally and the beam is then lowered to deposit the workpiece from the carriage onto a support surface. The beam may therefore form part of a walking beam bed in which the beam is positioned parallel to and between a pair of stationary supports and the means for raising and lowering the beam is such that the beam can be raised and lowered so that the support provided by the carriage is above and below the upper surface of the stationary supports relatively.

In order that the invention may be more readily understood it will now be described, by way of example only, with reference to the accompanying drawings in which FIG. 1 is a side elevation, partly in section of transfer apparatus, and FIG. 2 is a section on the line II—II of FIG. 1.

An H-section beam 1 is arranged substantially horizontal with its flanges vertical and its web 2 horizontal. The beam is supported on pairs of rollers 3 spaced apart at intervals along the length of the beam and engaging with wear plates on the underside of the web 2. At each end of the beam there are a pair of brackets 5 each supporting a pulley 6 between them. The brackets at one end of the beam are connected through a linkage 7 to a piston and cylinder device 8 whereby on actuation of the piston and cylinder device the beam is reciprocated in the direction of its length. A carriage 9 having a substantially flat workpiece support surface 10 is displaceable along the length of the beam with wheels 11 on the carriage engaging with wear plates extending along the upper side of the web 2.

A flexible member in the form of a metal cable 12 is connected at its ends through turnbuckles 13 to opposite ends of the carriage and the cable passes around the pulleys 6 so that there is a reach 14 of the cable extending beneath the beam along its length. Intermediate the ends of the cable and on the reach 14 there is a peg 15 which is positioned in a slot 16 formed in a bracket 17 secured to a foundation. The peg 15 serves to anchor the cable and on displacement of the beam there is relative movement between the beam and the cable which causes the carriage to be displaced along the beam relative to the beam.

To bring about movement of the carriage along the beam between a first position and a second position, it is only necessary to displace the beam through a distance which is less than the distance between the first and second positions because in addition to the movement of the carriage due to the movement of the beam there is further relative movement between the carriage and the beam.

The rollers 3 are supported on one arm of respective bell crank levers 18 which are pivotable about shafts 19 journalled in bearings 20. The other arms of the bell crank levers are connected to a connecting rod 21 to which the piston of a piston cylinder device 22 is connected. On actuating the piston cylinder device 22 the levers 18 are pivoted about the shafts 19 thereby raising or lowering the beam 1.

In order to transfer a workpiece such as a metal slab or section from one position to another, the workpiece may be lowered onto the carriage and the carriage displaced along the beam to a second position and in the second position the workpiece is lifted from the carriage. It is preferred however for the beam 1 to be positioned between and parallel to a pair of stationary supports in the form of beams or roller tables 23 having substantially horizontal support surfaces 24. The workpiece to be transferred is supported on the support surfaces 24 overlying the carriage 10. The piston cylinder device 22 is operated to rotate the levers 18 and thereby raise the beam until the support surface 10 of the carriage engages with the underside of the workpiece and lifts it off of the support surfaces 24. In this raised position the piston cylinder device 8 is operated to cause the carriage and the workpiece to be displaced to the second position axially of the beam from the first position and the beam is then lowered causing the workpiece to be supported on the support surfaces 24 of the stationary beams and the carriage to be lowered below the workpiece so that the carriage can be displaced back along the beam to its original position. For large workpieces it is convenient for a plurality of the movable and stationary supports to be arranged side-by-side in parallel relation with each movable beam positioned between a pair of the stationary supports. The levers 18 for raising all the beams would be connected through the shafts 19 so that the movable beams are raised and lowered in unison and similarly the linkages 7 of the movable beams would be connected together so that these beams would be displaced in the direction of their length in unison.

Although in the embodiment of the invention shown in the drawings the bracket 17 is secured to a foundation it is possible for the bracket to be displaceable in the direction of the length of the beam and the displacement of the carriage along the beam is then at a speed which is representative of the difference between the speed of movement of the beam and the speed of movement of the bracket 17.

In accordance with the provisions of the patent statutes, we have explained the principles and operation of our invention and have illustrated and described what we consider to represent the best embodiment.

We claim:

1. Transfer apparatus comprising:
   an elongate beam arranged substantially horizontal on supports which permit the beam to be displaced in the direction of its length,
   means for displacing the beam in the direction of its length,
   a carriage providing a support for a workpiece,
   said carriage being supported on the beam so as to be displaceable therealong,
   an elongate flexible member connected at its ends to opposite ends of the carriage with a reach of the flexible member extending substantially parallel to the length of the beam, and
   anchor means fixed relative to the beam and connected to said flexible member at a position intermediate the ends of said member, the apparatus being so constructed and arranged that displacement of the beam relative to the anchor means causes the carriage to be displaced along the beam in addition to its movement with the beam.

2. Transfer apparatus as claimed in claim 1 in which the flexible member passes around a pair of pulleys positioned one at each end of the beam with said reach extending along the length of the beam.

3. Transfer apparatus as claimed in claim 1 in which said anchor means is connected to the flexible member at a position substantially half-way along the length of the flexible member.

4. Transfer apparatus as claimed in claim 1 in which said beam displacing means comprises a hydraulic piston-cylinder device.

5. Transfer apparatus as claimed in claim 1 and including means for raising and lowering the beam.

6. Transfer apparatus comprising:
   an elongate beam arranged substantially horizontal on rollers,
   a pair of stationary supports arranged parallel to and one on each side of the beam, the upper surfaces of each of said supports providing a workpiece support surface,
   means for displacing the beam in the direction of its length,
   a carriage providing a support for a workpiece,
   said carriage being supported on the beam so as to be displaceable thereby,
   an elongate flexible cable connected at its ends to opposite ends of the carriage and extending around pulleys positioned at the ends of the beam with a reach of the cable extending beneath and substantially parallel to the length of the beam,
   anchor means fixed relative to the beam and connected to said reach of the cable at substantially the mid point of the cable, and
   means for raising and lowering said rollers in unison between positions in which the workpiece support provided by the carriage is above and below the support surfaces of the stationary supports respectively.

* * * * *

UNITED STATES PATENT AND TRADEMARK OFFICE
CERTIFICATE OF CORRECTION

PATENT NO. : 3,970,191
DATED : July 20, 1976
INVENTOR(S) : Derek Oldfield and Dennis Postlethwaite It is certified that error appears in the above—identified patent and that said Letters Patent are hereby corrected as shown below:

Insert after

ASSIGNEE : -- Davy-Loewy Limited, Sheffield, England --.

and delete

[Wean United, Inc., Pittsburgh, Pa.]

Signed and Sealed this

Fifteenth Day of February 1977

[SEAL]

Attest:

RUTH C. MASON
*Attesting Officer*

C. MARSHALL DANN
*Commissioner of Patents and Trademarks*